March 31, 1970 — G. L. WELCH — 3,503,092
DOOR BALANCE MECHANISM
Filed Jan. 10, 1968
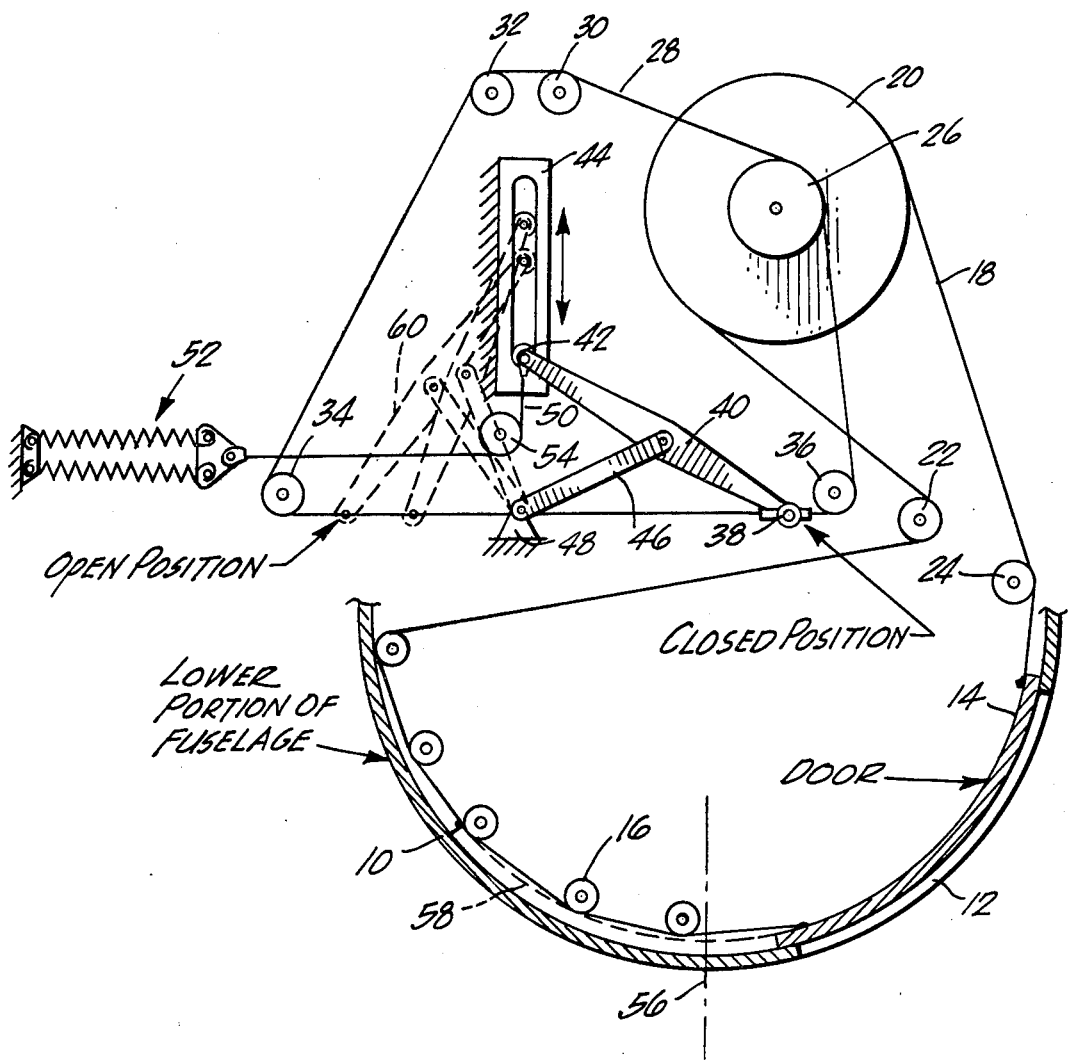
INVENTOR.
GRAYDON L. WELCH
BY
Jack C. Munro
-AGENT-

United States Patent Office 3,503,092
Patented Mar. 31, 1970

3,503,092
DOOR BALANCE MECHANISM
Graydon L. Welch, Artesia, Calif., assignor to McDonnell Douglas Corporation, a corporation of Maryland
Filed Jan. 10, 1968, Ser. No. 696,781
Int. Cl. E05d *13/12*
U.S. Cl. 16—1          4 Claims

ABSTRACT OF THE DISCLOSURE

A counter balance system for a door wherein a spring operates through a linkage to maintain the door in a neutral state in conjunction with its fixed supporting structure negating the pull of gravity thereon.

BACKGROUND OF THE INVENTION

The use of counter balance mechanisms for the opening and closing fo doors is well known. Such mechanisms have been found to be especially adaptable to large overhead doors where the door is of great weight. The overhead type of door is a door which must be lifted substantially in a vertical direction from a lower position to a higher position resulting in its opening thereof. Usually the counter balance mechanism for such types of doors is merely a simple spring arrangement wherein the spring assembly functions to assist in the upward movement of the door thereby requiring only a relatively small amount of manual force to move the door against the pull of gravity. Such a spring assembly also assists in the closing of the door in that it prevents the door from falling by gravity resulting in the door moving slowly downward to assume its closed position.

A special problem of counter balancing is encountered when the movement of the door is non-planar as opposed to the planar movement of the overhead door as aforementioned. Such a non-planar movement in a door can be found in an aircraft fuselage. Usually fuselages of aircraft are in the shape of a body of revolution with the upper portion of the fuselage and the lower portion of the fuselage being of a curved design. It is to be understood that upper as opposed to lower refers to the normal flying position of the aircraft with upper being skyward and lower being toward the earth. It is common that the doors located in the lower portion of the aircraft fuselage (which are employed to permit the access of cargo thereto) move in an arc of the circle from the open to the closed position and vice versa. The movement of the door in relation to the gravity force is such that when the door is first opened it is pulled by gravity downward until it reaches a dead center position. Completing the movement of the door to the fully opened position, the door moves against the pull of gravity until the said position is achieved.

Clearly to employ a simple constant spring balance mechanism upon such a door would be more of a hindrane than an assistance in the opening and closing of the door. Such a spring counter balance system would obviously not be applicable to the non-planar movement of an aircraft door.

SUMMARY OF THE INVENTION

The apparatus of this invention connects the top and bottom portions of the door through a rotating drum to a linkage assembly. The linkage assembly comprises a main link and a connecting link. One end of the main link is connected through a cable to the same drum assembly which operates the door. The other end of the main link is slidably contained within a guide. One end of the connecting link is pivotally attached to approximately the mid-point of the main link and pivotally attached to a fixed member relative thereto. A spring assembly is attached to the end of the main link which is contained within the guide. The guide is mounted in a longitudinal direction with respect to the fixed end of the connecting link. The physical limitations of the main link and connecting link are such that when the end of the main link is at its greatest displacement in the guide the door assembly is in the dead center position and the net effect of the pull of gravity thereon is zero. To move the main link to the position of greatest displacement requires a force against the action of the spring, the main component of which is the force of gravity acting upon the door. Once the main link passes the dead center position (and also the door) an assistance force is needed to raise the door on the other side of the fuselage. Such a force occurs as the spring now is pulling the main link from its maximum displacement position.

The main advantages of applicant's counter balance system are: (1) By the choosing of the correct combination of spring and linkage arrangement in view of the weight of the door employed and its arc of movement, the amount of assisting or hindering force which acts upon the door can be almost exactly equal to the gravity force thereon; (2) The door is easily opened and closed and may be stopped in any position and the door will remain static; (3) There is no need for the employment of a separate mechanism to hold the door in the open position or in any other position; and (4) Due to the simplicity of the mechanism of this invention, the mechanism is relatively low in weight and can be manufactured inexpensively.

BRIEF DESCRIPTION OF THE DRAWING

The figure is a schematic sectional view of an embodiment of applicant's invention showing the linkage in both the closed and open position.

DESCRIPTION OF THE SHOWN EMBODIMENT

Referring specifically to the drawing, the figure shows a lower portion of an aircraft fuselage 10 having an opening 12 located therein. A door 14 is formed to close off the opening 12. Door 14 is made to move substantially non-frictionally by means of rollers 16 within the fuselage 10. Connected to door 14 is a cable 18 which is wound about a drum 20 and securely attached thereto. Cable 18 is connected to both the fore and aft ends of door 14. Cable 18 is maintained in a taut position at all times by means of pulleys 22 and 24.

Integrally connected to drum 20 is a smaller drum 26. A continuous cable 28 is wound about and securely fastened to drum 26 and is maintained in a taut condition by means of pulleys 30, 32, 34 and 36. Pivotally attached at 38 to cable 28 is one end of a main link 40. The free end of main link 40 contains a roller 42 mounted thereon, roller 42 being permitted to move within a guide 44 which is fixedly secured to a portion of the aircraft fuselage 10. At approximately the mid-point of main link 40 is pivotally attached connecting link 46, the other end of connecting link 46 being pivotally secured to a bracket 48 which is also fixedly attached to a portion of the aircraft fuselage 10. The end of main link 40 which has mounted thereon the roller 42, has provision for the attachment of cable 50. The free end of cable 50 is secured to a spring assembly 52 which is also securely fastened to the aircraft fuselage 10. Pulley 54 maintains cable 50 in a taut position through the action of the spring assembly 52 and also maintains cable 50 in a desired alignment. The desired alignment of the portion of cable 50 located between pulley 54 and roller 42 is to be in line with the longitudinal axis of the guide 44. Also the center point of the pivotal connection of the interconnecting link 46 with bracket 48 should be in alignment with the aforesaid portion of cable 50.

Operation of the mechanism as shown is as follows: With the door 14 in the closed position as shown in solid lines in the drawing, the main link 40 is positioned so the roller 42 is positioned at the bottom of the guide 44 and displaced a minimum distance from bracket 48. As the door 14 is opened, gravity will assist in the opening movement until the center of gravity of the door coincides with the dead center position of the fuselage as represented by line 56. During this stage of door movement the main link 40 is being displaced so that roller 42 is moved upward within guide 44. It is to be noted that the amount of force required varies from a maximum with the roller in the lowermost position of the guide to zero when the roller is displaced a maximum distance upward within guide 44. This variance coincides with the gravity force acting upon the door 14. In other words, with the door in the fully closed position, the greatest amount of force is acting upon the door and, when the door is located so that its center of gravity coincides with line 56, the pull of gravity has no dynamic effect upon the door 14. Therefore, when the door is initially opened, if it were not for applicant's counter balance mechanism, the gravity would automatically move the door until it rested in the dead center position. However, this invention causes the weight of the door 14 to act through the linkage assembly moving the main link 40 and expanding the spring 52. As the door 14 is moved from its dead center position to the fully opened position, the main link 40 is rotated past its own dead center position which is when connecting link 46 is in line with the longitudinal axis of main link 40. At this point the action of the spring 52 tends to pull the roller end 42 of the main link 40 downward and to the minimum displacement position with respect to bracket 48. This assisting movement is transmitted through cable 28 to drum 26 through drum 20 to cable 18 and operates upon door 14 to tend to move it to the fully opened position as shown in dotted lines 58. Also, it is to be recognized that, as the roller 42 moves toward its minimum displacement position, the force transmitted within cable 28 increases and becomes a maximum with the roller 42 located in the lowermost position of guide 44. This force variance reversely coincides with the gravity force acting upon the door 14. Main link 40 as shown in phantom at 60 depicts the location of main link with the door in its fully opened position.

The particular form of the present invention shown in the drawing and described herein has been found to be most satisfactory. However, the various elements of the combination and the form, construction and arrangements thereof are capable of numerous changes and modifications. In view thereof, it should be understood that the form of this invention shown in the drawing are herein described is intended to be illustrative only and is not intended to limit the scope of this invention.

What is claimed is:

1. A counterbalance mechanism for a door comprising:
   a linkage assembly including a first portion and a second portion, said first portion being movable between a first position and a second position which respectively corresponds with the door movement between the open and closed positions; said door movement being arcuate, said door being capable of assuming a neutral intermediate position in conjunction with the door supporting structure, and said second portion being operatively associated with a biasing means, whereby said linkage assembly and said biasing means counteract the net force of gravity upon said door in both the open and closed positions and all positions intermediate thereof.

2. An apparatus as defined in claim 1 wherein:
   said linkage assembly comprises a main link and a connecting link, said first portion being one end of said main link, said second portion being the other end of said main link, one extremity of said connecting link being pivotally connected to said main link intermediate said ends, the other extremity of said connected link being pivotally attached to a fixed bracket, said second portion being confined within a guide permitting lineal movement of said second portion, the pivot axis of said connecting link with said fixed bracket being in line with the lineal movement of said second portion.

3. An Apparatus as defined in claim 2 wherein:
   said connecting link being connected to said main link at its mid-point thereof.

4. An apparatus as defined in claim 3 wherein:
   said biasing means comprises a tension spring arrangement.

References Cited

UNITED STATES PATENTS 2,729,862  1/1956  Marjama.

BOBBY R. GAY, Primary Examiner

U.S. Cl. X.R.

16—497; 49—445